(12) United States Patent
Wieclawski et al.

(10) Patent No.: US 8,517,328 B2
(45) Date of Patent: Aug. 27, 2013

(54) SINGLE POINT EASY ENTRY SEAT LATCH FOR A VEHICLE SEAT

(75) Inventors: Stanislaw Andrzej Wieclawski, Hohenkammer (DE); Krzysztof Wroblewski, Washington, MI (US); Wee T. Gam, Troy, MI (US)

(73) Assignee: Lear Corporation, Southfield, MI (US)

( * ) Notice: Subject to any disclaimer, the term of this patent is extended or adjusted under 35 U.S.C. 154(b) by 244 days.

(21) Appl. No.: 12/713,209

(22) Filed: Feb. 26, 2010

(65) Prior Publication Data

US 2011/0012004 A1 Jan. 20, 2011

(30) Foreign Application Priority Data

Jul. 20, 2009 (DE) .................... 10 2009 033 892

(51) Int. Cl.
*F16M 13/00* (2006.01)
(52) U.S. Cl.
USPC ........................................ 248/429; 297/341
(58) Field of Classification Search
USPC ............. 248/424, 429, 430; 297/341, 344.11
See application file for complete search history.

(56) References Cited

U.S. PATENT DOCUMENTS

| | | | |
|---|---|---|---|
| 4,639,038 A | 1/1987 | Heling | |
| 4,652,052 A | 3/1987 | Hessler et al. | |
| 4,781,354 A * | 11/1988 | Nihei et al. | 248/429 |
| 4,881,774 A | 11/1989 | Bradley et al. | |
| 5,137,331 A | 8/1992 | Colozza | |
| 5,547,159 A | 8/1996 | Treichl et al. | |
| 5,641,145 A * | 6/1997 | Droulon et al. | 248/429 |
| 5,899,532 A | 5/1999 | Paisley et al. | |
| 5,918,846 A * | 7/1999 | Garrido | 248/429 |
| 6,098,946 A * | 8/2000 | Sechet et al. | 248/424 |
| 6,257,541 B1 * | 7/2001 | Timon et al. | 248/429 |
| 6,341,819 B1 | 1/2002 | Kojima et al. | |
| 6,619,741 B1 | 9/2003 | Tame | |
| 6,688,574 B2 * | 2/2004 | Okazaki et al. | 248/424 |
| 6,767,063 B1 | 7/2004 | Abdella et al. | |
| 6,772,985 B2 * | 8/2004 | Lee | 248/424 |
| 6,908,155 B1 | 6/2005 | Wieclawski | |
| 6,981,681 B2 * | 1/2006 | Matsumoto | 248/424 |
| 7,090,188 B2 | 8/2006 | Severini et al. | |
| 7,293,752 B2 * | 11/2007 | McCulloch et al. | 248/429 |
| 7,735,798 B2 * | 6/2010 | Kojima | 248/429 |
| 7,918,507 B2 * | 4/2011 | Schmale | 297/341 |

(Continued)

FOREIGN PATENT DOCUMENTS

DE 19962653 A1 7/2000
DE 10321746 A1 8/2004

OTHER PUBLICATIONS

German Office Action dated Feb. 25, 2010 in German Case No. 10 2009 033 892.6-14.

*Primary Examiner* — Bradley Duckworth
(74) *Attorney, Agent, or Firm* — MacMillan, Sobanski & Todd, LLC

(57) ABSTRACT

A seat track assembly includes a lower track and an upper track slidably movable relative to the lower track. A latch is attached to the upper track and movable between a locked position wherein movement of the upper track is prevented, and an unlocked position wherein the upper track may be moved relative to the lower track. An actuation mechanism is provided and is movable between a first position wherein the latch is in the locked position, and a second position wherein the actuation mechanism engages the latch and urges the latch into the unlocked position.

19 Claims, 10 Drawing Sheets

(56) References Cited

U.S. PATENT DOCUMENTS

| | | | |
|---|---|---|---|
| 7,922,143 B2 * | 4/2011 | Park et al. | 248/429 |
| 8,006,949 B2 * | 8/2011 | Kojima et al. | 248/429 |
| 2003/0085330 A1 * | 5/2003 | Lee | 248/430 |
| 2003/0230696 A1 * | 12/2003 | Yamada et al. | 248/424 |
| 2004/0118990 A1 * | 6/2004 | Yokoi et al. | 248/424 |
| 2006/0131470 A1 * | 6/2006 | Yamada et al. | 248/424 |
| 2006/0261237 A1 * | 11/2006 | Noffz | 248/424 |

* cited by examiner

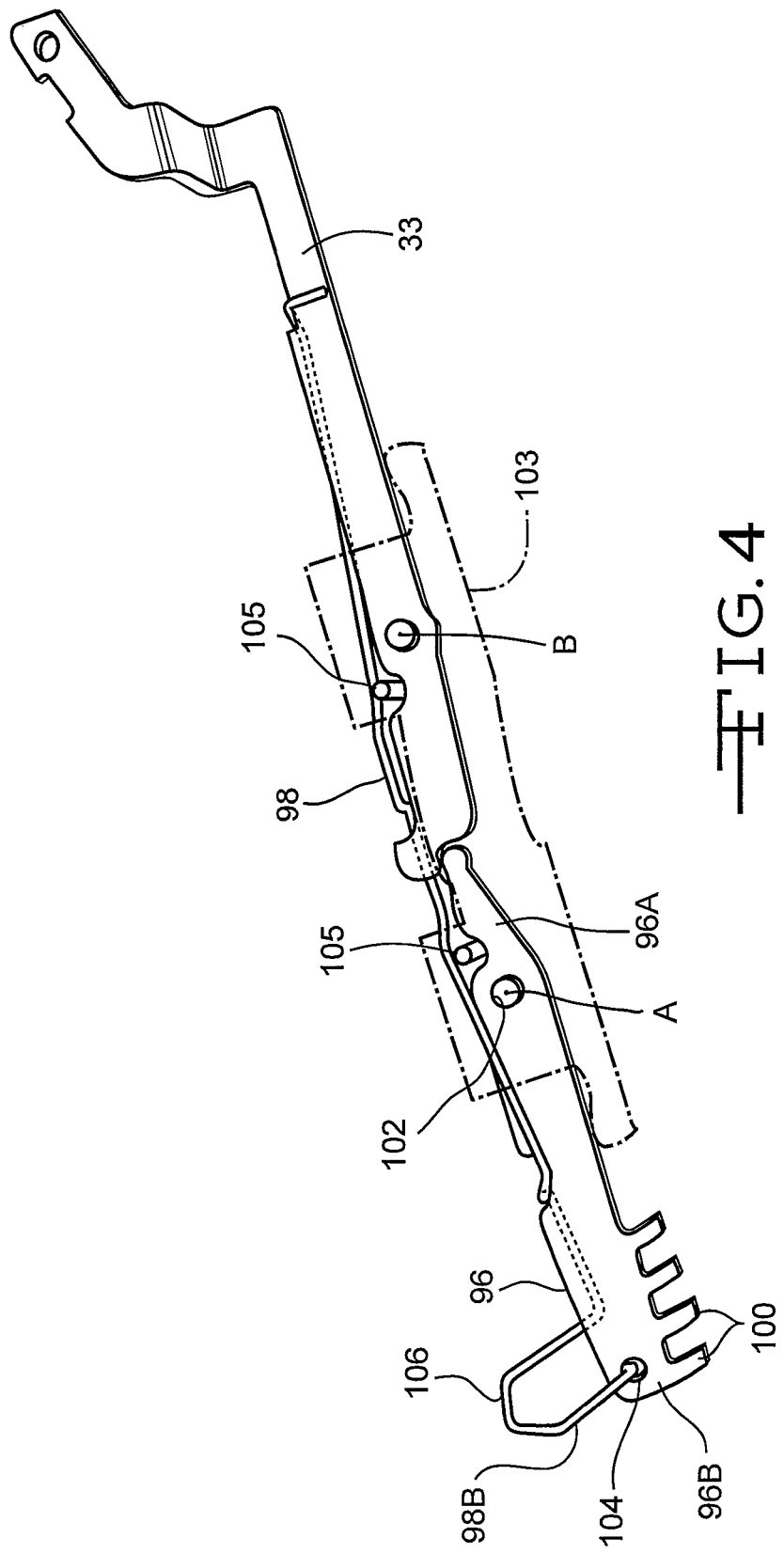

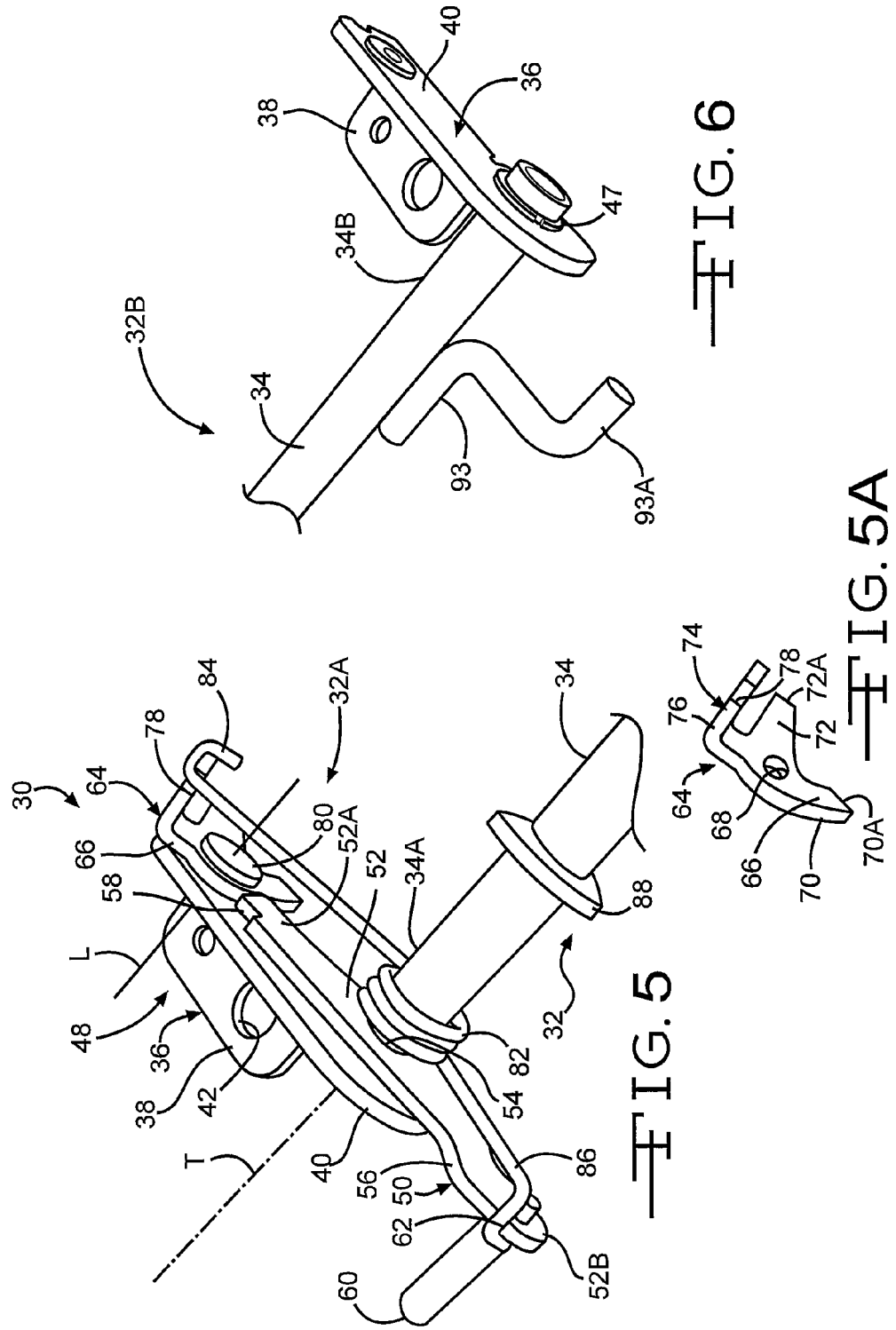

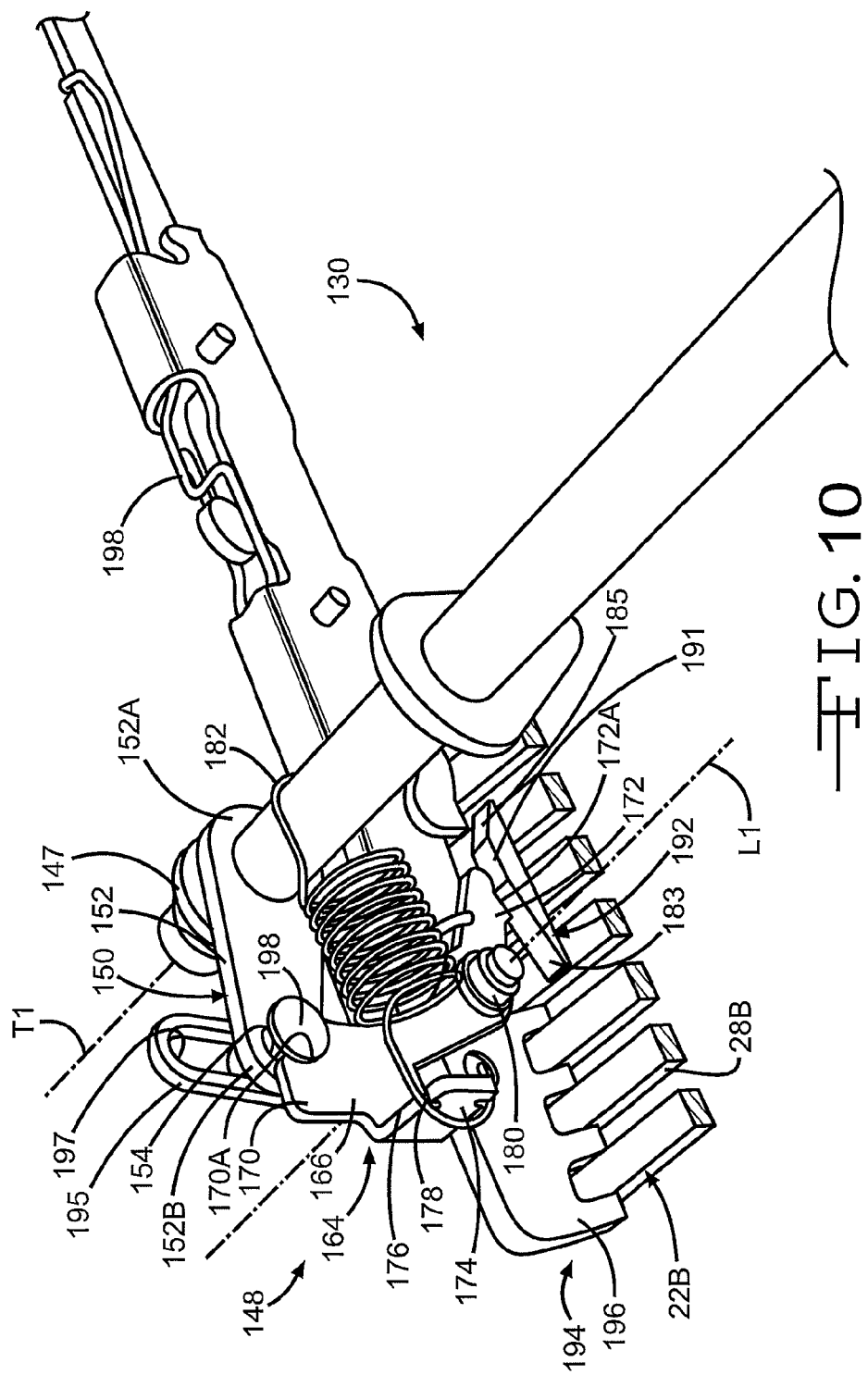

SINGLE POINT EASY ENTRY SEAT LATCH FOR A VEHICLE SEAT

CROSS REFERENCE TO RELATED APPLICATIONS

This application claims the benefit of German Patent Application No. 10 2009 033 892.6, filed Jul. 20, 2009, the disclosure of which is incorporated herein by reference.

BACKGROUND

Various embodiments of a seat track assembly are described herein. In particular, the embodiments described herein relate to an improved seat track assembly for a vehicle.

Automotive vehicles include vehicle seat assemblies for supporting an occupant seated in the vehicle. The seat assemblies typically comprise a seat cushion and a seat back pivotally connected to the seat cushion by a recliner mechanism for providing adjustment of the seat back relative to the seat cushion between a plurality of reclined positions. Further, seat assemblies typically include a track assembly which allows incremental forward and rearward sliding adjustment of the seat assembly within the vehicle within a comfort range of seating positions, such as between a full forward and full rearward position.

It is common for a track assembly to allow the seat assembly to slide forwardly to a forwardly extended position beyond a passenger comfort range, i.e. the full forward position, in order to allow access to an area behind the seat assembly. Some track assemblies known in the art as single point memory systems allow the seat assembly to return from the full forward position to one particular position preselected by the manufacturer. More complex and expensive track assemblies allow the seat to be returned to the position the seat was in before the seat was moved forward.

U.S. Pat. No. 7,090,188 discloses a vehicle track assembly for providing forward and rearward movement of a seat assembly and having a single point memory system. The track assembly includes a seat dumping mechanism 42 comprising a cam plate 44 and V-shaped pawl 68 engaging the cam plate 44.

U.S. Pat. No. 7,293,752 discloses a positive engagement latch for a vehicle seat having an engaging member 34a. The engaging member 34a has a plurality of teeth 38a which engage apertures 28A in the lower track 22A.

SUMMARY

The present application describes various embodiments of a seat track assembly. One embodiment of the seat track assembly includes a lower track and an upper track slidably movable relative to the lower track. A latch is attached to the upper track and movable between a locked position wherein movement of the upper track is prevented, and an unlocked position wherein the upper track may be moved relative to the lower track. An actuation mechanism is provided and is movable between a first position wherein the latch is in the locked position, and a second position wherein the actuation mechanism engages the latch and urges the latch into the unlocked position.

Other advantages of the seat track assembly will become apparent to those skilled in the art from the following detailed description, when read in light of the accompanying drawings.

BRIEF DESCRIPTION OF THE DRAWINGS

FIG. 4 is perspective view of a portion of the latch mechanism illustrated in FIG. 2.

FIG. 5 is an enlarged perspective view of the actuation mechanism illustrated in FIG. 2.

FIG. 6 is an enlarged perspective view of the second end of the torsion tube assembly illustrated in FIG. 2.

FIG. 10 is a perspective view of a portion of the easy entry single point memory mechanism illustrated in FIG. 9.

DETAILED DESCRIPTION

Figure 1:
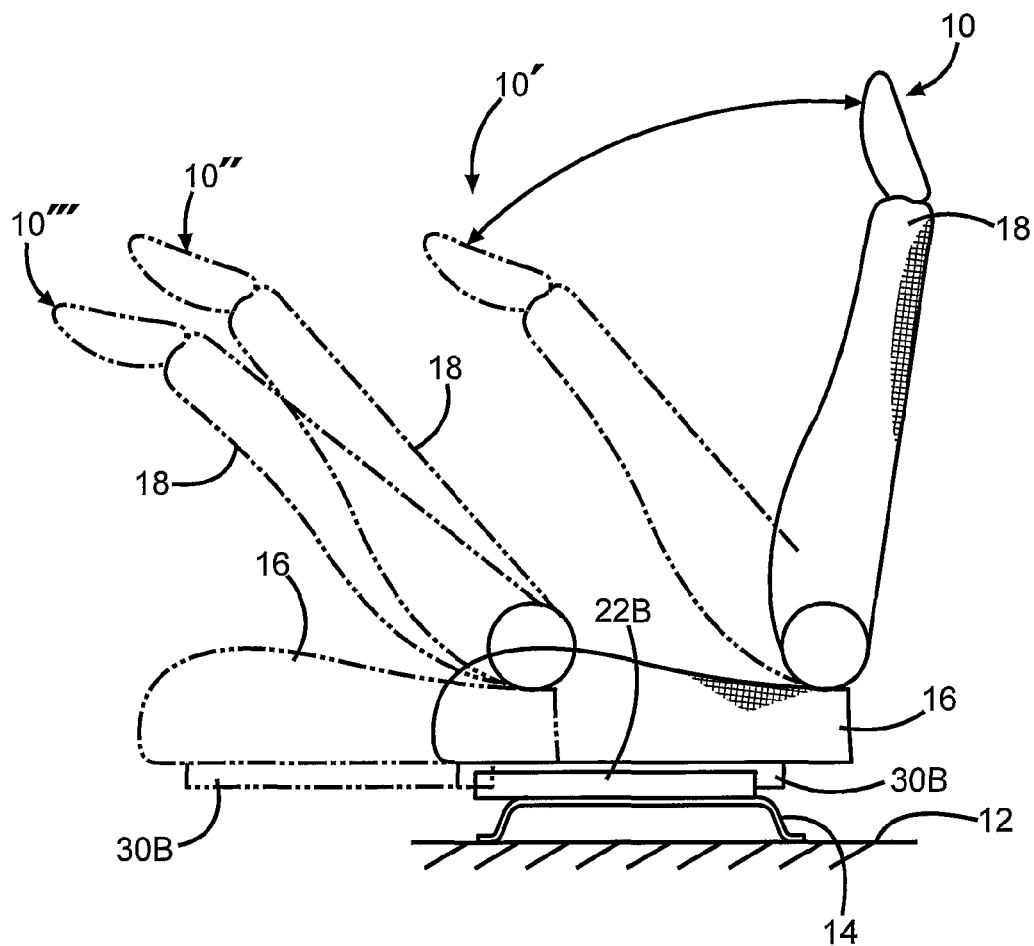
FIG. 1 is a schematic view of an automotive seat assembly.

Referring now to FIG. 1, a vehicle seat assembly is shown generally at 10. The illustrated vehicle seat assembly 10 is mounted to a floor 12 of a motor vehicle (not shown). The seat assembly 10 includes a seat bottom 16, a seat back 18 pivotally connected to the seat bottom 16, and a seat track assembly 20 for forward and rearward movement of the seat bottom 16 and seat back 18 relative to the vehicle floor 12. If desired, the seat track 20 may be mounted to a seat bracket 14, which may be attached to the vehicle floor 12, as shown in FIG. 1.

The illustrated seat assembly 10 is movable between an upright position, such as shown at 10 in FIG. 1, a forwardly dumped position, such as shown by phantom line 10', a fully forward position, such as shown by phantom line 10'', and a maximum dumped position, such as shown by phantom line 10'''.

Figure 2:
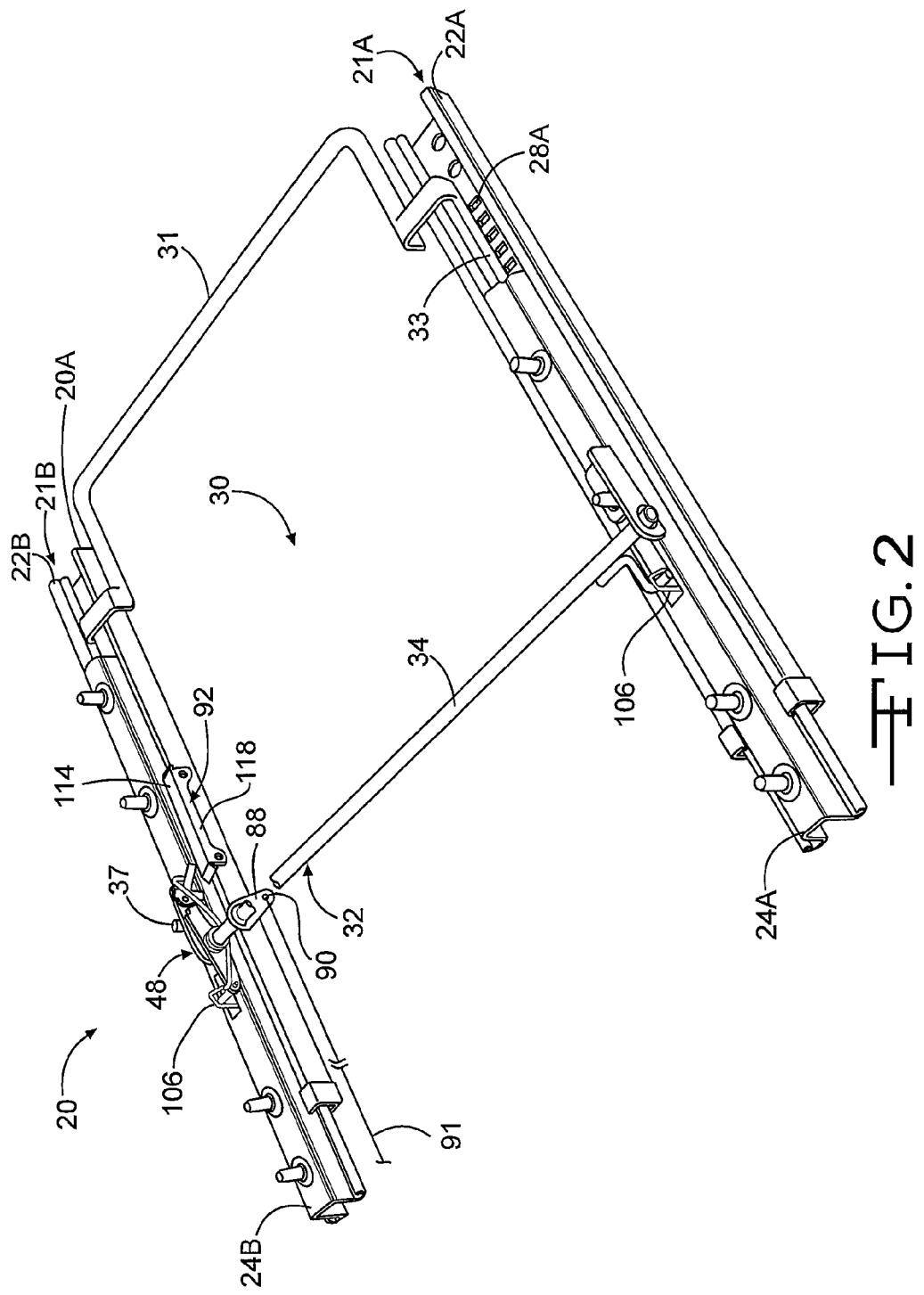
FIG. 2 is a perspective view of a seat track assembly showing a first embodiment of an easy entry single point memory mechanism.

Referring to FIG. 2, the seat track assembly 20 includes two track assemblies 21A and 21B that are each disposed proximate a side of the seat bottom 16. The illustrated track assembly 21A includes first or lower tracks and second or upper tracks 22A and 24A, respectively. The tracks 22A and 24A are structured and configured to allow movement of one track 22A, 24A relative to the other track 24A, 22A. Similarly, the track assembly 21B includes first or lower tracks and second or upper tracks 22B and 24B, respectively. The tracks 22B and 24B are structured and configured to allow movement of one track 22B, 24B relative to the other track 24B, 22B.

In the embodiment illustrated in FIG. 2, for example, each lower track 22A, 22B is structured and configured to be fixedly attached to the vehicle floor 12, and each upper track 24A, 24B is slidably mounted on a respective lower track 22A, 22B. The upper tracks 24A, 24B may also be attached to the seat bottom 16 such that the upper tracks 24A, 24B, and the seat bottom 16 may be moved forwardly and rearwardly along the lower tracks 22A, 22B.

The tracks 22A, 22B and 24A, 24B may have any suitable configuration. In the embodiment shown in the figures, each lower track 22A, 22B has a substantially U-shaped transverse section and includes a plurality of spaced apart apertures 28A and 28B, respectively, formed in a surface thereof (the apertures 28A and 28B are formed in a lower surface of the lower track 22A and 22B, respectively when viewing FIG. 2). Each illustrated upper track 24A, 24B has a generally inverted U-shaped transverse section relative to the lower tracks 22A and 22B, respectively, and is slidably received in each respective lower track 22A and 22B. In the illustrated embodiment, the apertures 28A and 28B are spaced within the range of from about 8 mm to about 12 mm apart. It will be understood that the apertures 28A and 28B may be spaced any desired distance apart.

A seat adjustment handle or towel bar 31 is mounted in a known manner to a first end 20A of the seat track assembly 20. The towel bar 31 includes longitudinally extending actuator arms 33 which engage the trigger 96 as shown in FIG. 4 and explained in detail below.

Referring now to FIGS. 2 through 8, the details of the easy entry single point memory mechanism 30 will now be discussed. The illustrated memory mechanism 30 includes a torsion tube assembly 32. As best shown in FIG. 5, the torsion tube assembly 32 includes a torsion tube 34 and is attached to the upper tracks 24A and 24B by attachment brackets 36. The attachment brackets 36 include first and second legs 38 and 40, disposed about 90 degrees apart. The first leg 38 includes a first aperture 42. In the illustrated embodiment, the first aperture 42 is disposed about a stud 37 extending outward of the upper track 24B. A fastener, such as a push nut (not shown) may be attached to the stud 37 to secure the bracket 36 to the upper track 24B. The second leg 40 includes a second aperture for receiving an end of the torsion tube 34. The first and second ends 34A and 34B of the torsion tube 34 may be pivotally attached to the brackets 36 of the torsion tube 34 by any desired means. In the illustrated embodiment, the torsion tube 34 is attached within the second aperture of the second leg 40 of the bracket 36 to with a plastic bushing 47 (best shown in FIG. 5) and a push nut (not shown).

A first end 32A of the torsion tube assembly 32 includes an actuation mechanism 48. The actuation mechanism 48 includes a first actuator or lift link assembly 50. The illustrated lift link assembly 50 has an elongated and substantially flat body 52 having a first end 52A (facing the front of the seat assembly 10), a second end 52B (facing the rear of the seat assembly 10), a centrally formed mounting aperture 54, and a peripheral edge surface 56. A first notch 58 is formed in the edge surface 56 at the first end 52A. A lift finger 60 extends outwardly from the second end 52B. A first spring groove 62 is formed in the edge surface 56 at the second end 52B. The first end 34A of the torsion tube 34 extends through the mounting aperture 54. The lift link assembly 50 is fixedly attached to the torsion tube 34 inboard of the attachment bracket 36 about a pivot axis T. The lift link assembly 50 may be attached to the torsion tube 34 by any desired method such as by welding.

The actuation mechanism 48 further includes a second actuator or lock link 64. The lock link 64 includes a substantially flat body 66, a centrally formed mounting aperture 68, a radially extending first leg 70, the distal end of which defines a first engagement surface 70A, a radially extending second leg 72, the distal end of which defines a second engagement surface 72A, and a third leg 74. The third leg 74 includes a peripheral edge surface 76 and extends outwardly at an angle of about 90 degrees from the plane of the body 66. A second spring groove 78 is formed in the edge surface 76. A fastener, such as the pivot rivet 80 illustrated in FIG. 5, extends through the mounting aperture 68 and the third aperture 46 to pivotally attach the lock link 64 to the attachment bracket 36 about a pivot axis L.

In the illustrated embodiment a helical torsion spring 82 is fixedly mounted to the torsion tube 34. A first free end 84 of the spring 82 is disposed in the spring groove 78 and urges the lock link 64 in a clockwise direction about the axis L. A second free end 86 of the spring 82 is disposed in the spring groove 62 and urges the lift link assembly 50 in a counter-clockwise direction about the axis T.

An actuation link 88 is attached to the torsion tube 34 inboard of the actuation mechanism 48. The actuation link 88 may be attached to the torsion tube 34 by any desired method such as by welding. The actuation link 88 includes an attachment aperture 90 and is operatively connected to the seat assembly 10 by a cable or rod (schematically illustrated at 91 in FIG. 2), such that movement of the seat back 18 from the upright position 10 to the forward dumped position 10', moves the cable 91 toward the rear of the seat assembly 10 and urges the actuation link 88 and the torsion tube 34 to rotate in a clockwise direction about the axis T. If desired, a cable load-limiter (not shown) may be attached to the cable 91 to allow a relatively smooth rotation of the torsion tube 34 when the seat back 18 is moved from the upright position 10 to the forwardly dumped position 10'.

A second or slave end 32B of the torsion tube assembly 32 includes an attachment bracket 36 attached to the second end 34B of the torsion tube 34 as described above. A lift rod 93 includes an outwardly extending end 93A and is attached to the second end 34B of the torsion tube 34. The purpose of the lift rod 93 will be explained in detail below.

Figure 8:
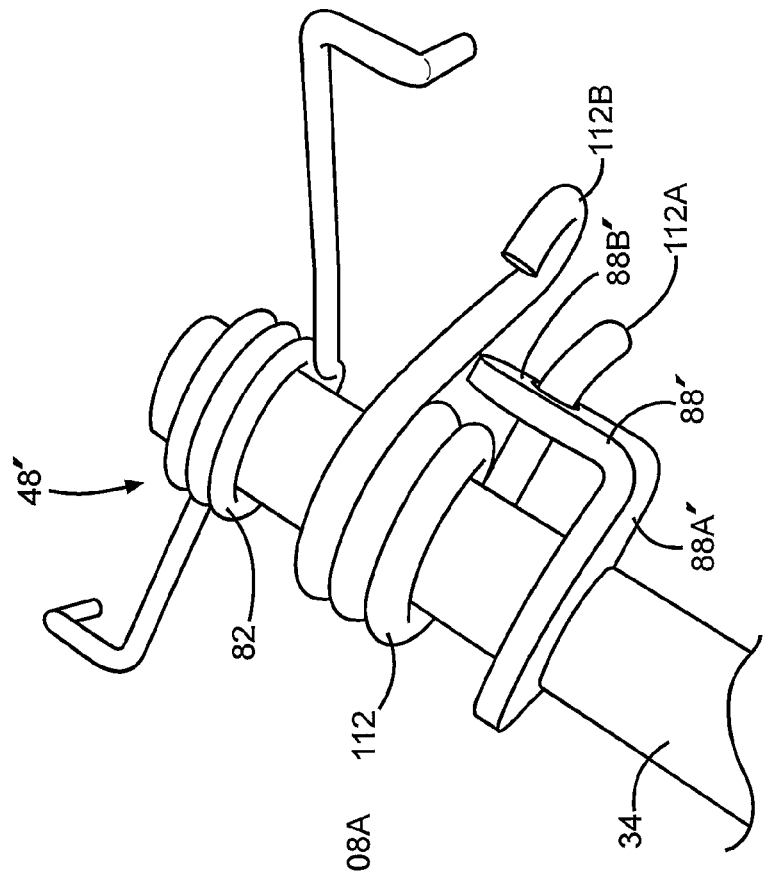
FIG. 8 is an enlarged perspective view of a portion of an alternative embodiment of the torsion tube assembly illustrated in FIGS. 2, 3, and 5.

An alternative embodiment of a portion of the actuation mechanism is shown generally at 48' in FIG. 8. The actuation mechanism 48' includes an alternative embodiment of the actuation link 88'. The actuation link 88' includes a leg 88B' extending outwardly (outboard of the seat assembly 10) at about 90 degrees from a body 88A' of the actuation link 88'. A torsion spring 112 is attached to the torsion tube 34 between the actuation link 88' and the torsion spring 82. A first free end 112A of the torsion spring 112 is attached to the leg 88B' of the actuation link 88'. A second free end 112B may be attached to a cable or rod, such as the cable 91 shown in FIG. 2. Advantageously, use of the torsion spring 112 may eliminate the need for a cable load-limiter.

An external memory member or plate 92 is attached to an upper inboard side of the lower track 22B and defines the easy entry memory point, as described in detail below. The memory plate includes a body 92A having substantially L-shaped transverse section having a first portion 114 defining a cam or engagement surface 116 and a second portion 118. In the illustrated embodiment, the second portion 118 includes mounting apertures 120. Ramp portions 122 are formed at the distal ends of the first portion 114. The memory plate 92 may be attached to the lower track 22B by any desired method, such as by welding.

A latch or latch mechanism 94 includes a trigger 96 and a trigger spring 98. In the illustrated embodiment, one trigger 96 is shown, however it will be understood that two or more triggers 96 may also be provided. An example of a latch mechanism having one or more triggers is described in U.S. Pat. No. 7,293,752, which is incorporated herein by reference.

Referring now to FIG. 4, the illustrated trigger 96 is substantially flat having a first end 96A and a second end 96B.

The second end 96B and includes a plurality of teeth 100 for engaging the apertures 28B in the lower track 22B. First and second apertures 102 and 104 are formed through the trigger 96. The illustrated trigger 96 is pivotally attached to a trigger housing 103 about a pivot axis A through the first aperture 102 by any suitable fastener such as a rivet (not shown). The trigger housing 103 may be attached to the upper track 24B by any desired means, such as by the pins 105. A second end 98B of the illustrated trigger spring 98 is inserted into the second aperture 104. The illustrated trigger spring 98 further includes an outwardly extending (upwardly extending when viewing FIG. 4) lifting member or loop 106.

A first end 98A of the trigger spring 98 extends toward the front of the seat assembly 10 and urges against the actuator arm 33. The actuator arm 33 may be pivotally attached to the trigger housing 103 about a pivot axis B and is structured and configured to engage the first end 96A of the trigger 96.

The trigger spring 98 urges the teeth 100 into engagement with the apertures 28B, in the lower track 22B. The trigger 96 is pivotable between a locked position in which one or more teeth 100 engage the lower track 22B and extend into one or more apertures 28B, as shown in FIG. 3A, and an unlocked position in which the teeth 100 are disengaged from the apertures 28B, as shown in FIGS. 3B through 3E.

Figure 7:
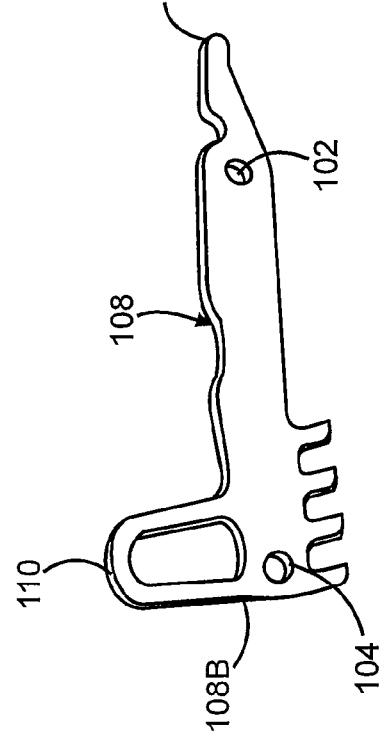
FIG. 7 is a plan view of an alternate embodiment of the trigger illustrated in FIGS. 2 and 3A-E.

Referring now to FIG. 7, an alternate embodiment of the trigger is shown generally at 108. The trigger 108 is substantially identical to the trigger 96 but includes an integrally formed lifting loop 110 at the second end 108B thereof. A trigger spring (not shown) used with the trigger 108 would therefore not require the lifting loop 106 as shown in the trigger spring 98.

FIGS. 3A through 3E illustrate the operation of the memory mechanism 30 as the seat assembly 10 moves from the upright position 10 to the forwardly dumped position 10', to the fully forward position 10" to the maximum dumped position 10''', and returning to the memory point.

Figure 3A:
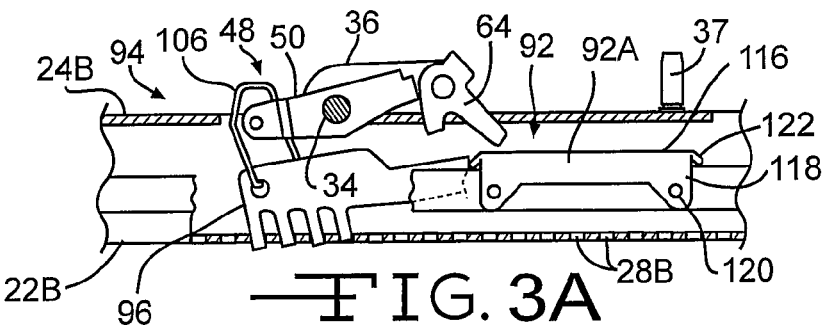
FIGS. 3A-3E are cross sectional elevational views of a portion of the easy entry single point memory mechanism illustrated in FIG. 2, showing the memory mechanism in a plurality of operational positions.

FIG. 3A illustrates the actuation mechanism 48 and the latch mechanism 94 when the seat assembly 10 is in the upright position. In FIG. 3A, the latch mechanism 94 is in the locked position and the actuation mechanism 48 is in a first position wherein the lift link assembly 50 is urged counterclockwise by the torsion spring 82 (for purposes of clarity, not illustrated in FIGS. 3A-3E) and the lift finger 60, as best shown in FIG. 5, does not engage the lifting loop 106. Additionally, the lock link 64 is urged clockwise by the torsion spring 82 into a first or unlocked position.

Figure 3B:
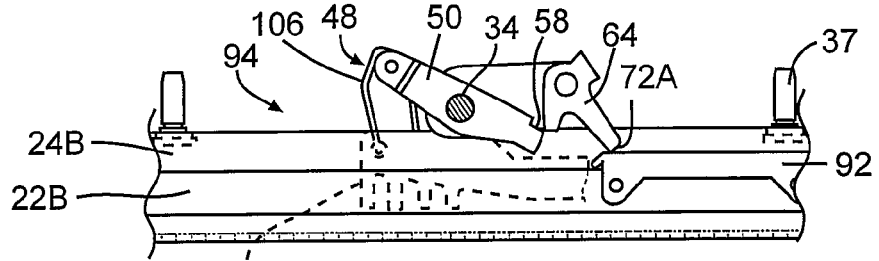

FIG. 3B illustrates the actuation mechanism 48 and the latch mechanism 94 when the seat assembly is in the forwardly dumped position, as shown at 10'. In FIG. 3B, the latch mechanism 94 is in the unlocked position and the actuation mechanism 48 is in a second position wherein the lift link assembly 50 is urged clockwise. Movement of the seatback 18 to the forwardly dumped position 10' causes the cable 91 to move the torsion tube 34 and the attached lift link assembly 50 clockwise about the axis T. The lift finger 60 engages the lifting loop 106 and moves the latch mechanism 94 to the unlocked position. The lock link 64 is urged clockwise by the torsion spring 82, and the second engagement surface 72A of the second leg 72 engages the memory plate 92.

Figure 3C:
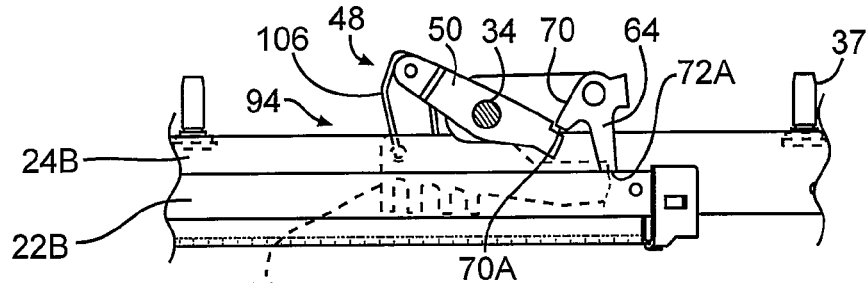

FIG. 3C illustrates the actuation mechanism 48 and the latch mechanism 94 when the seat assembly is in the fully forward position, as shown at 10". During movement of the seat assembly from the forwardly dumped position 10' to the fully forward position 10", the latch mechanism 94 remains in the unlocked position. The second engagement surface 72A of the second leg 72 is moved toward the front of the seat assembly 10. The second leg 72 disengages from the memory plate 92 and the lock link 64 is urged clockwise by the torsion spring 82 to a second or locked position wherein the first engagement surface 70A of the first leg 70 engages the lift link assembly 50 in the first notch 58.

Figure 3D:
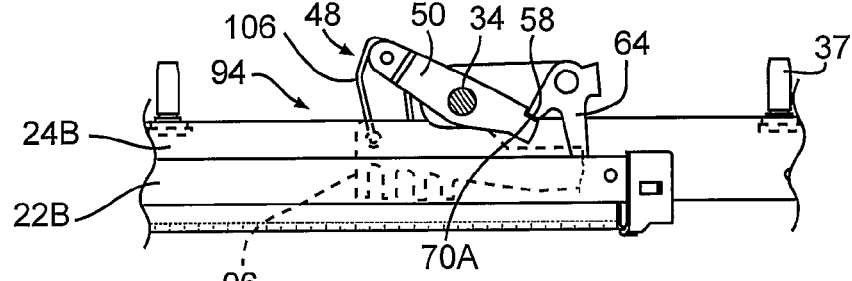

FIG. 3D illustrates the actuation mechanism 48 and the latch mechanism 94 when the seat assembly is returned to the upright position 10. As shown, the latch mechanism 94 remains in the unlocked position, and the lift link assembly 50 is urged counterclockwise until the first notch 58 of the lift link assembly 50 engages the first engagement surface 70A of the first leg 70 of the lock link 64.

Figure 3E:
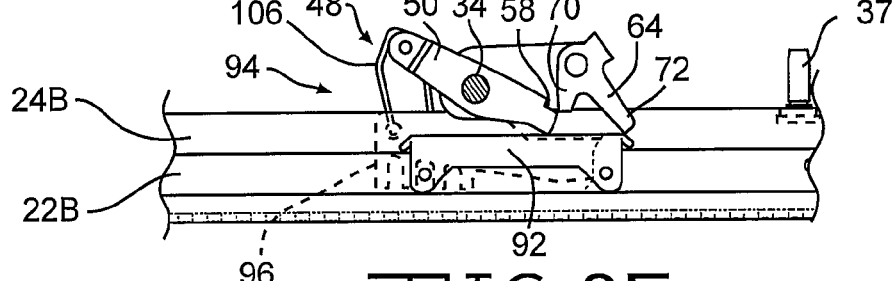

FIG. 3E illustrates the actuation mechanism 48 and the latch mechanism 94 when the seat assembly is returned to the upright position 10 and moved rearwardly such that the seat assembly 10 reaches the memory point. At the memory point, the second leg 72 of the lock link 64 engages the memory plate 92 causing the lock link 64 to rotate counterclockwise. The counterclockwise movement of the lock link 64 causes the first leg 70 of the lock link 64 to disengage from the notch 58 of the lift link assembly 50. The lift link assembly 50 then rotates counterclockwise allowing the lift finger 60 to disengage from the lifting loop 106, thereby removing the upward force on the trigger 96 and allowing the latch mechanism 94 to return to the locked position, as shown in FIG. 3A.

At the second end 32B of the torsion tube 32, as shown in FIG. 6, the lift rod 93 may engage the lifting loop 106 of a trigger 96 mounted in the track assembly 21A in the same manner that the trigger 96 is mounted in the track assembly 21B described above.

Referring now to FIGS. 9 through 11E, a first alternative embodiment of the easy entry single point memory mechanism is shown generally at 130.

The torsion tube assembly 132 includes a torsion tube 134 and is attached to the upper tracks 24A and 24B by attachment brackets 136. The attachment bracket 136 includes a body 137, an outwardly extending (upwardly extending when viewing FIG. 9 first leg 138, a second leg 140, and third leg 142. The second and third legs 140 and 142 extend inwardly (inboard of the seat assembly 10). The illustrated second leg 140 is structured and configured for attaching and or supporting a cable load limiter 128. The illustrated third leg 142 has an aperture 144.

The attachment bracket 136 may be attached to the upper track 24A, 24B by any desired means, such as by welding. Alternatively, a fastener, such as a push nut (not shown) may be attached to a stud, such as the stud 37 in FIG. 9 to secure the bracket 136 to the upper track 24A, 24B. The first leg 138 includes an aperture 145 for receiving the first end 134A of the torsion tube 134. The first end 134A of the torsion tube 134 may be pivotally attached to the bracket 136 any desired means. In the illustrated embodiment, the torsion tube 134 is attached within the aperture 145 with a plastic bushing 147 and a push nut (not shown).

A first end 132A of the torsion tube assembly 132 includes an actuation mechanism 148. The actuation mechanism 148 includes a lift link assembly 150. The illustrated lift link assembly 150 has an elongated and substantially flat body 152 having a first end 152A (fixedly attached to the torsion tube 134) and a second end 152B (facing the rear of the seat assembly 10) having an aperture 154 formed therethrough. The lift link assembly 150 is fixedly attached to the torsion tube 134 about a pivot axis T1. The lift link assembly 150 may be attached to the torsion tube 134 by any desired method such as by welding.

A lock link 164 includes a substantially flat body 166 pivotally attached to the upper track 24B. In the illustrated embodiment, the body 166 is pivotally attached to the upper track 24B by a rivet 180 about an axis L1. A first leg 170 extends generally upwardly, the distal end of which includes a first or pivot pin engagement notch 170A. A second leg 172 extends generally forwardly and downwardly, the distal end of which defines a second engagement surface 172A, and a third leg 174. The third leg 174 extends inwardly (inboard of the seat assembly 10) at an angle of about 90 degrees from the plane of the body 166. At least one spring groove 178 may be formed in an edge surface 176 of the third leg 174.

In the illustrated embodiment a first helical extension spring 182 interconnects the third leg 174 of the lock link 164 and the torsion tube 134. The first spring 182 urges the lock link 164 in a clockwise direction about the axis L1.

In the illustrated embodiment a second helical extension spring 184 interconnects the actuation link 88 and the third leg 142 of the attachment bracket 136. The second spring 184 urges the actuation link 88 in a counterclockwise direction about the axis T1.

Figure 9:
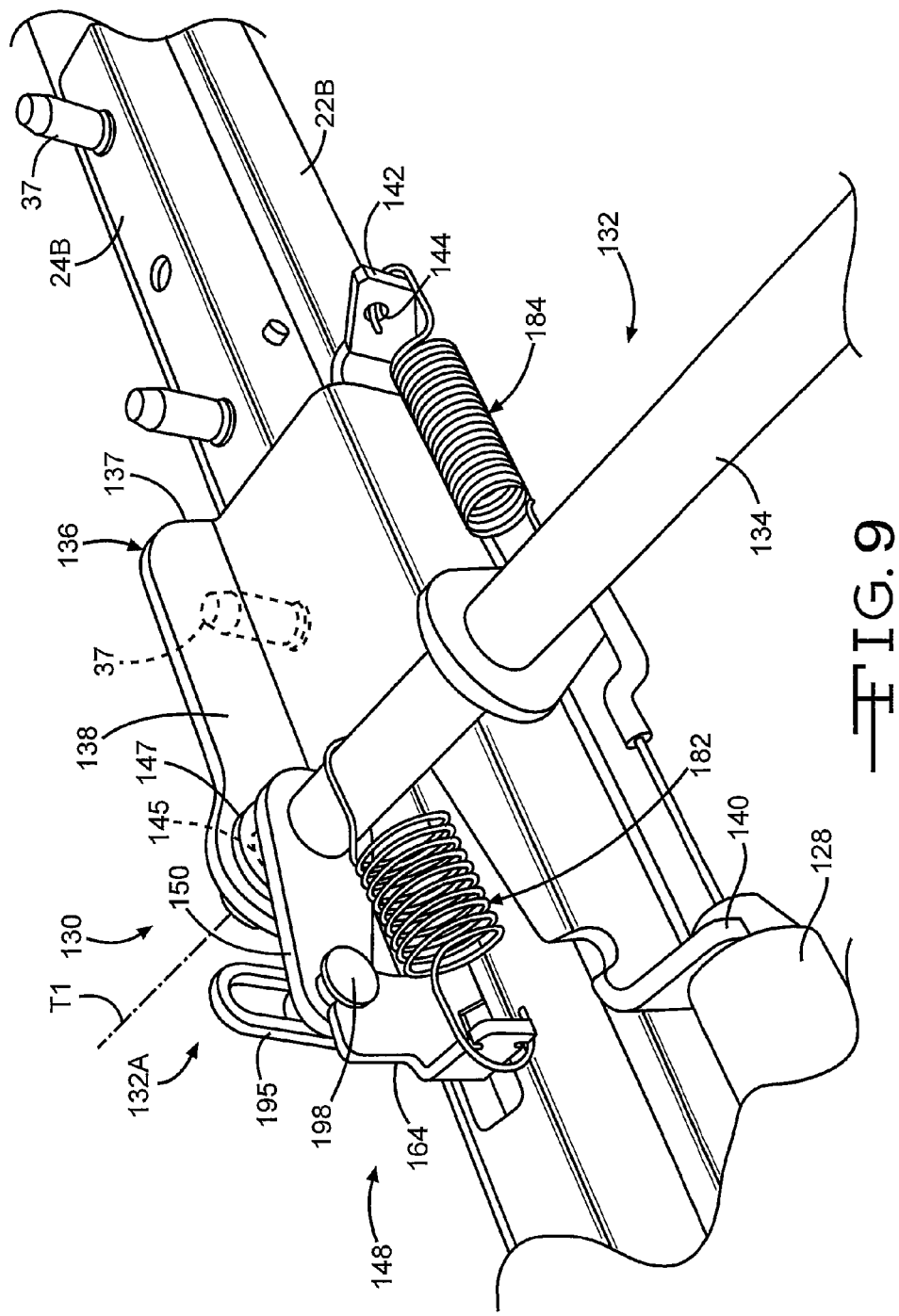
FIG. 9 is a perspective view of a portion of a seat track assembly showing a first alternate embodiment of an easy entry single point memory mechanism.

In the embodiment illustrated in FIG. 9, the actuation link 88 is operatively connected to the seat assembly 10 by a cable load-limiter 128 and a cable or rod (not shown).

In the illustrated embodiment, a memory member or plate 192 is attached to the inside lower wall of the lower track 22B (upwardly facing surface when viewing FIG. 192) and defines the easy entry memory point. The memory plate 192 includes a first ramp portion 183 and a second ramp portion 185 defining first and second engagement surfaces, respectively. A substantially horizontal surface 191 extends between the first ramp portion 183 and the second ramp portion 185. The memory plate 192 may be attached to the lower track 22B by any desired method, such as by welding.

The latch mechanism 194 is substantially similar to the latch mechanism 94 and includes a trigger 196 and a trigger spring 198. A trigger lift member 195 extends outwardly (upwardly when viewing FIG. 10). In the illustrated embodiment, the lift member 195 defines an elongated slot 197 structured and configured for slidably receiving a pivot pin 198.

FIGS. 11A through 11E illustrate the operation of a second alternate embodiment of the memory mechanism 130' as the seat assembly 10 moves from the upright position 10 to the forwardly dumped position 10', to the fully forward position 10" to the maximum dumped position 10''', and returning to the memory point. The memory mechanism 130' is substantially similar to the memory mechanism 130, and includes an actuation mechanism 148', and a lift link assembly 150' having a notch 151 formed in a second end (facing the rear of the seat assembly) thereof. The memory mechanism 130' further includes a latch mechanism 194', a lift member 195' integrally formed with the trigger 196' and the lock link 164'. As illustrated in FIGS. 11A through 11E, the front of the vehicle is indicated by the arrow F. It will be understood that the elevational views of the memory mechanism 130' in FIGS. 11A through 11E are taken from the outboard side of the seat assembly 10.

Figure 11A:
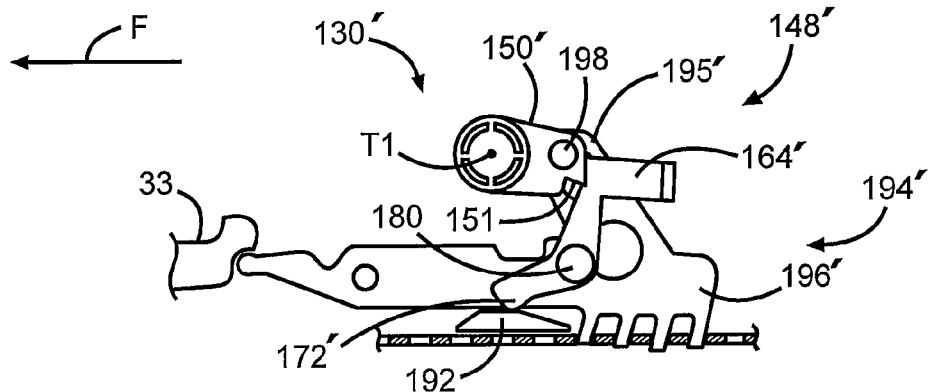
FIGS. 11A-11E are cross sectional elevational views of a portion of the easy entry single point memory mechanism illustrated in FIGS. 9 and 10, showing the memory mechanism in a plurality of operational positions.

FIG. 11A illustrates the actuation mechanism 148 and the latch mechanism 194' when the seat assembly 10 is in the upright position. In FIG. 11A the latch mechanism 194' is in the locked position and the actuation mechanism 148' is in a first position wherein the lift link assembly 150' is urged clockwise by the torsion spring 182 (for purposes of clarity, not illustrated in FIGS. 11A-11E) and the rivet 198 does not engage the lift member 195. Additionally, the lock link 164' is urged counterclockwise by the torsion spring 182 (for purposes of clarity, not illustrated in FIGS. 11A-11E).

Figure 11B:
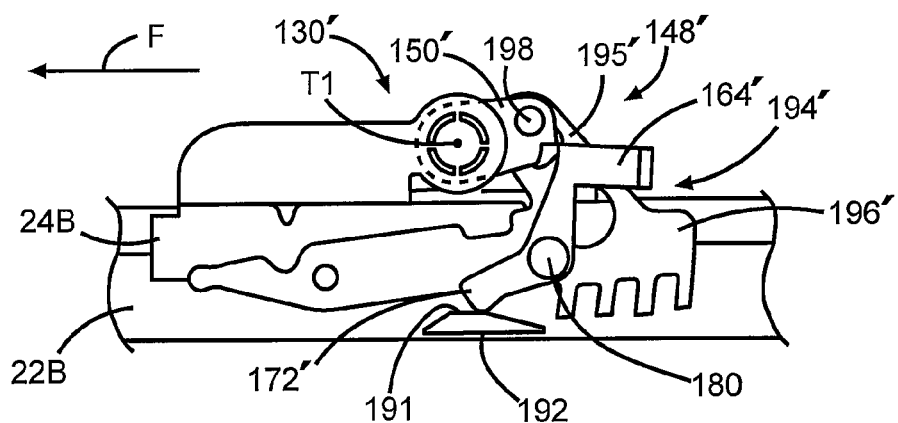

FIG. 11B illustrates the actuation mechanism 148' and the latch mechanism 194' when the seat assembly is in the forwardly dumped position, as shown at 10'. Movement of the seatback 18 to the forwardly dumped position 10' causes the cable 91 to move the torsion tube 134 and the attached lift link assembly 150' counterclockwise about the axis T1. The rivet 198 engages an end of the slot 197' and moves the latch mechanism 194' to the unlocked position. The second leg 172' of the lock link 164' is urged into engagement with the memory plate 192.

Figure 11C:
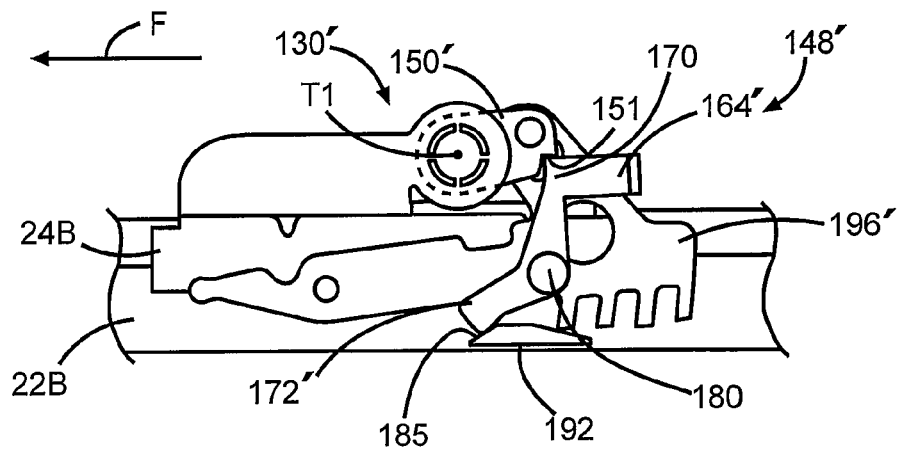

FIG. 11C illustrates the actuation mechanism 148' and the latch mechanism 194" when the seat assembly is in the fully forward position, as shown at 10". During movement of the seat assembly from the forwardly dumped position 10' to the fully forward position 10", the latch mechanism 194' remains in the unlocked position. The second leg 172 is moved toward the front of the seat assembly 10 and engages the second ramp portion 185 of the memory plate 192, and the lock link 164' is urged counterclockwise by the torsion spring 182 until a portion of the first leg 170 engages the lift link assembly 150' in the notch 151.

Figure 11D:
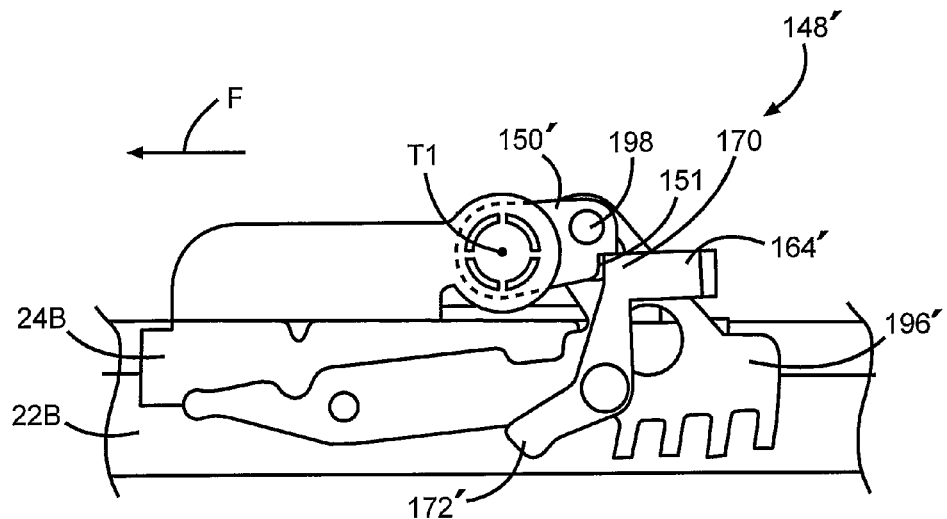

FIG. 11D illustrates the actuation mechanism 148' and the latch mechanism 194' when the seat assembly is returned to the upright position 10. As shown, the latch mechanism 194' remains in the unlocked position, and the lift link assembly 150' remains urged counterclockwise into the notch 151 of the lift link assembly 150'.

Figure 11E:
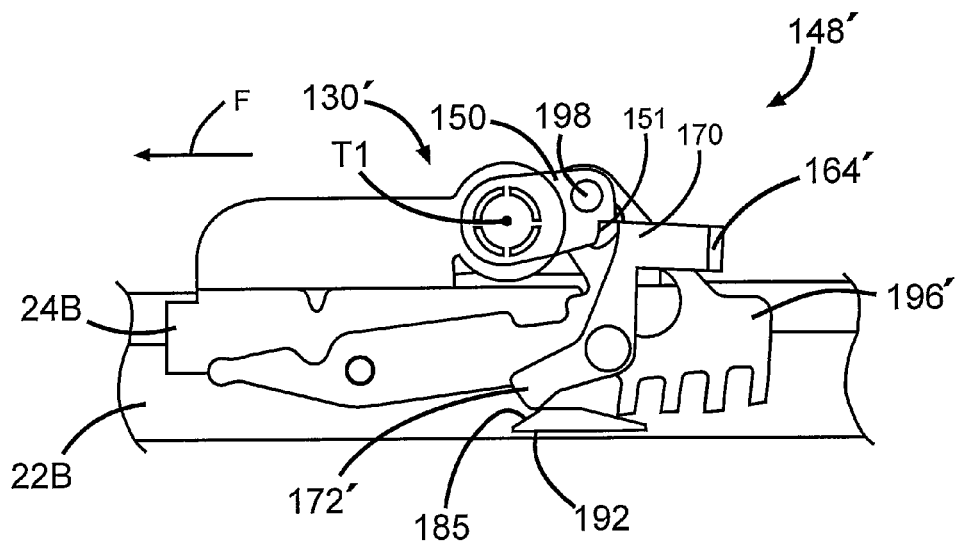

FIG. 11E illustrates the actuation mechanism 148' and the latch mechanism 194' when the seat assembly is returned to the upright position 10 and moved rearwardly such that the seat assembly 10 reaches the memory point. At the memory point, the second leg 172 of the lock link 164' engages the memory plate 92 causing the lock link 164' to rotate clockwise. The clockwise movement of the lock link 164 causes the first leg 170 of the lock link 164' to disengage from the notch 151 of the lift link assembly 150'. The lift link assembly 150' then rotates clockwise allowing the rivet 198 to slide inwardly (downwardly when viewing FIG. 11E) within the slot 197 of the lift member 195, thereby removing the upward force on the lift member 195 and allowing the latch mechanism 194' to return to the locked position, as shown in FIG. 11A.

The principle and mode of operation of the seat track assembly have been described in its preferred embodiment. However, it should be noted that the seat track assembly described herein may be practiced otherwise than as specifically illustrated and described without departing from its scope.

What is claimed is:

1. A seat track assembly comprising:
   a lower track;
   an upper track slidably movable relative to the lower track;
   a latch mechanism attached to the upper track and movable between a locked position wherein movement of the upper track is prevented, and an unlocked position wherein the upper track may be moved relative to the lower track; and
   an actuation mechanism including a first actuator pivotally mounted to the upper track about a first pivot axis and a second actuator pivotally mounted to the upper track about a second pivot axis, wherein the latch mechanism and the actuation mechanism are formed from separate components;
   wherein pivotal movement of the first actuator moves the latch mechanism between the locked and unlocked positions; and
   wherein the second actuator moves between a first position wherein the first actuator is free to pivot and a second position wherein the first actuator is prevented from pivoting.

2. The seat track assembly according to claim 1, wherein a portion of the actuation mechanism is disposed within the upper track.

3. The seat track assembly according to claim 2, further including a memory member extending outwardly of a lower surface of the lower track.

4. The seat track assembly according to claim 3, wherein the memory member is disposed substantially along a longitudinally extending axis of the lower surface of the lower track.

5. The seat track assembly according to claim 1, further including a memory member extending outwardly of and fixedly attached to the lower track, the memory member defining a cam surface for a portion of the actuation mechanism.

6. The seat track assembly according to claim 5, wherein the memory member is an elongated member mounted on one of an inboard and an outboard side of the lower track.

7. The seat track assembly according to claim 1, further including a memory member extending outwardly of the lower track.

8. The seat track assembly according to claim 7, wherein the memory member is an elongated member mounted on one of an inboard and an outboard side of the lower track.

9. The seat track assembly according to claim 8, wherein the memory member defines a cam surface.

10. The seat track assembly according to claim 9, wherein when the second actuator engages the cam surface of the memory member, the second actuator is moved to the first position wherein the second actuator disengages the first actuator and the latch returns to the unlocked position.

11. A seat track assembly comprising:
a lower track;
an upper track slidably movable relative to the lower track;
a latch mechanism attached to the upper track and movable between a latched position wherein movement of the upper track is prevented, and an unlatched position wherein the upper track may be moved relative to the lower track;
a first actuator pivotally mounted to the upper track about a first pivot axis; and
a second actuator pivotally mounted to the upper track about a second pivot axis, wherein the latch mechanism and the first and second actuators are formed from separate components;
wherein the latch mechanism includes a trigger pivotable between a locked position in which the trigger is engaged with the lower track, and an unlocked position in which the trigger is disengaged from the lower track;
wherein pivotal movement of the first actuator moves the latch mechanism between the locked and unlocked positions; and
wherein the second actuator moves between a first position wherein the first actuator is free to pivot and a second position wherein the first actuator is prevented from pivoting.

12. The seat track assembly according to claim 11, further including a memory member extending outwardly of and fixedly attached to the lower track.

13. The seat track assembly according to claim 12, wherein the memory member is an elongated member mounted on one of an inboard and an outboard side of the lower track.

14. The seat track assembly according to claim 13, wherein the memory member defines a cam surface.

15. The seat track assembly according to claim 14, wherein when the second actuator engages the cam surface of the memory member, the second actuator is moved to the first position wherein the second actuator disengages the first actuator and the latch returns to the unlocked position.

16. The seat track assembly according to claim 11, wherein a portion of the first actuator is disposed within the upper track.

17. The seat track assembly according to claim 16, wherein the memory member extends outwardly of a lower surface of the lower track.

18. The seat track assembly according to claim 17, wherein the memory member is disposed substantially along a longitudinally extending axis of the lower surface of the lower track.

19. The seat track assembly according to claim 11, further including a spring attached to the trigger, the spring urging the trigger into the locked position; wherein the spring defines a lifting member; and wherein the first actuator engages the lifting member to urge the latch into the unlocked position.

* * * * *